UNITED STATES PATENT OFFICE.

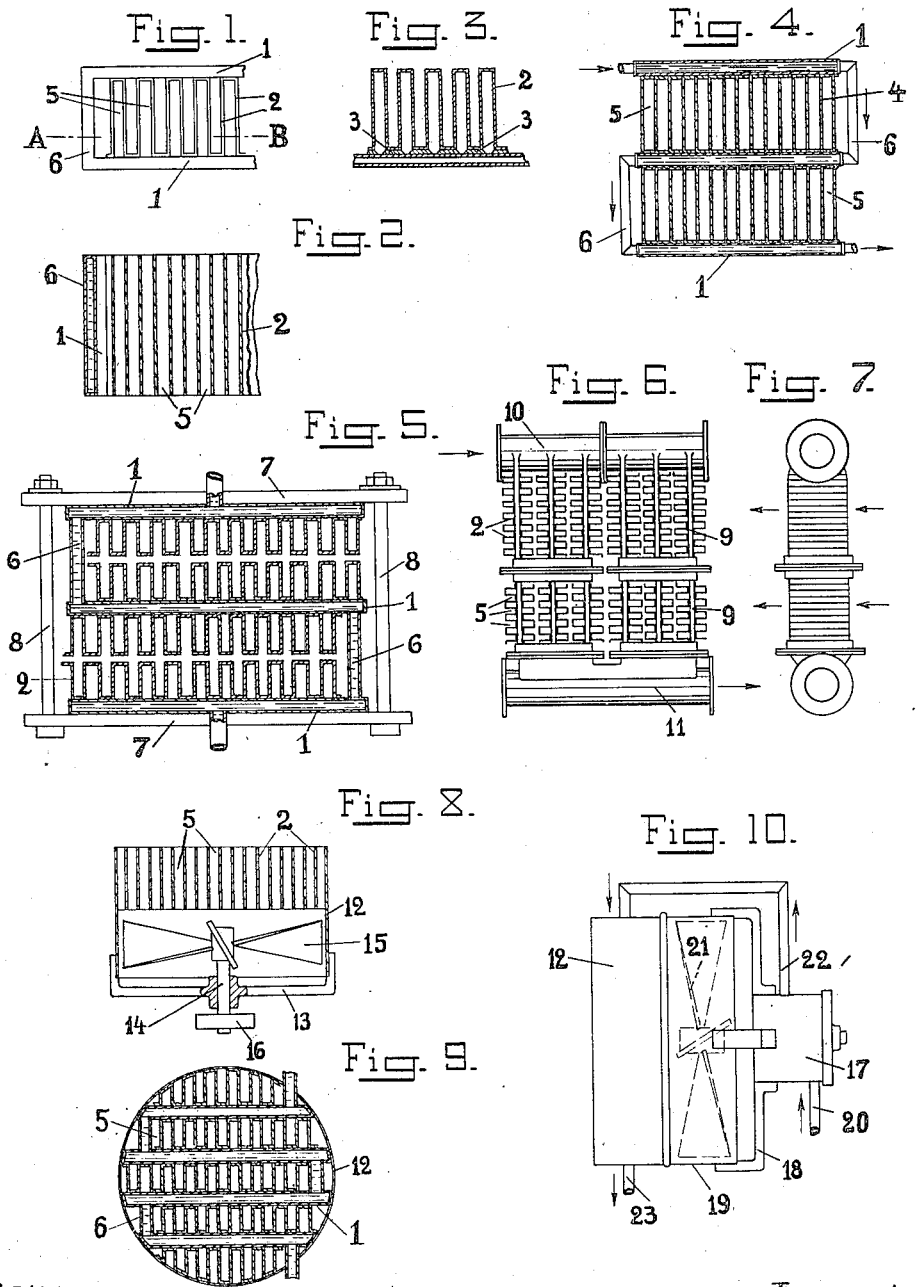

HUGO JUNKERS, OF AIX-LA-CHAPELLE, GERMANY.

HEATING AND COOLING APPARATUS.

1,208,790. Specification of Letters Patent. Patented Dec. 19, 1916.

Application filed November 8, 1904. Serial No. 231,867.

*To all whom it may concern:*

Be it known that I, HUGO JUNKERS, professor in the Royal Polytechnicum at Aix-la-Chapelle, Germany, a subject of the King of Prussia, residing at No. 64 Brabantstrasse, Aix-la-Chapelle, in the Kingdom of Prussia, Empire of Germany, have invented certain new and useful Improvements in Heating and Cooling Apparatus; and I do hereby declare the following to be a full, clear, and exact description of the invention, such as will enable others skilled in the art to which is appertains to make and use the same.

My present invention relates to a heating and cooling apparatus suitable for being equally well adapted for heating or cooling rooms, such as living-rooms, offices, factories, theaters, cellars and the like.

Steam, heated liquids, cold liquids, or vapors may be used in the apparatus as the heat changing mediums.

A characteristic feature of this apparatus is, that the channels for conducting the air to be heated are formed of thin sheet-metal strips bent to from a serpentine with rectangular corners and attached to flat metallic conduits, through which the heat-changing medium passes at a right angle to the direction of the air to be heated. To obtain the best results a number of such conduits may be surrounded by a mantle and then the air forced through the air-channels at a high velocity by mechanical means, in order to thus attain the highest efficiency of the apparatus.

In the following specification the invention is nearly always spoken of as a heating apparatus, but the same structure is just as much applicable for a cooling apparatus and for an apparatus constructed to suit both purposes at will.

In the accompanying drawings: Figure 1 is an elevation of two flat metallic heat-changing medium conduits provided with serpentine-shaped sheet-metal conducting plates. Fig. 2 is a sectional view of Fig. 1 taken on line A—B. Fig. 3 is a sectional view of a part of a flat metallic heat-changing medium conduit and a part of a serpentine-shaped sheet-metal conducting plate, showing how both parts are united. Fig. 4 shows a modification of the serpentine-shaped conducting plates, in sectional view. Fig. 5 is a cross-sectional view of three conduits held together by bars and bolts, whereas in each conduit is provided with its own serpentine-shaped conducting plates. Fig. 6 shows how the heat-changing medium conduits armed with serpentine-shaped conducting plates form integral parts of the inlet and outlet pipes. Fig. 7 is an end-view of Fig. 6. Figs. 8 and 9 show different sectional views of an apparatus inclosed in a circular mantle or shell and provided with a mechanically driven fan for creating an air current. Fig. 10 is an elevation of an apparatus provided with a fan rotated by means of a heat-changing medium itself.

The metallic conduits 1 are perferably of rectangular shape and comparatively flat, as shown in Fig. 1. Upon the flat faces of said conduits conducting plates 2 are secured by solder-joints 3 as shown in Fig. 3, but may of course be secured thereto in any other manner known to persons versed in the art to which this invention appertains. The conducting plates 2 are preferably formed of continuous strips of sheet metal, but may also be composed of a number of U-shaped elements 4, as shown in Fig. 4, so as to form serpentines with rectangular corners, as the air-channels 5 formed thereby give the best results. Any number of such metallic conduits 1 may be united to form a heating or cooling body as shown in Fig. 5, in which figure the ends of the flat conduits are connected with each other by communication-pipes 6, whereas the metallic conduits themselves are held together by the bars 7 and the bolts 8.

A modification of the conduits for heating or cooling purposes is shown in Figs. 6 and 7, wherein the individual conduits 1 of Fig. 4 are replaced by the flat conduits 9 forming integral parts of the inlet-pipe 10 and the outlet-pipe 11 respectively. The sheet-metal conducting plates 2 are here secured to the conduits 9 as shown. If for instance steam be used for heating purposes it passes from the inlet-pipe 10 through the conduits 9 to the outlet-pipe 11. The heat transferred to the walls of said conduits is communicated to the conducting plates 2 and thus imparted to the air passing through the rectangular air-channels 5.

To attain the highest efficiency of the apparatus any number of such individual conduits are connected, either as illustrated in Figs. 5 and 6, wherein the conducting plates are secured to the individual metallic channel, or as shown in Figs. 1, 4 and 9, wherein two adjacent metallic conduits are connected by the same serpentine and the contiguous conduits are connected together at alternately opposite ends to form a single passage for causing the temperature changing medium to flow alternately in opposite directions through the radiator. The channels thus connected are then inclosed in an open ended cylindrical casing shell or mantle 12 to which the spider or frame 13 is secured for journaling therein the shaft 14 of the fan 15 which may be driven by a belt (not shown) passing over the driving pulley 16. Between the outer conduits and casing are sinuous or serpentine heated diffusing elements as shown.

Instead of driving the fan by mechanical means, as a belt or the like, it may be driven by the heat-changing medium itself. To this end it is only necessary to extend the shaft 14 of the fan 15 sufficiently to secure thereon the wheel 15$^a$ of a turbine inclosed in the casing 17 attached by means of the arms 18 to the shell or mantle 19, see Fig. 10. If steam be used as a heat-changing medium it will enter the turbine-casing 17 by way of pipe 20 and nozzle 20$^a$, and after driving the turbine and fan 21, it will pass through the pipe 22 into the metallic conduits inclosed in the shell or mantle 12 and arranged in a similar manner as indicated in Figs. 8 and 9. After the steam has successively passed through all the flat conduits it escapes by way of pipe 23. If, however, water is employed as a heat-changing medium then it flows first through the metallic heat-changing medium conduits inclosed by the shell or mantle 12 and passes afterward through the turbine inclosed in the casing 17. By means of this arrangement it is made possible to drive the fan at an exceptional low rate of expense, and the efficiency of the apparatus thus obtained makes it possible to employ it advantageously even where the heat-changing medium is very expensive, so that it is made possible to utilize the water furnished by municipal water works most economically for cooling purposes.

Where a number of flat metallic heat-changing medium conduits are employed and provided with serpentine-shaped sheet-metal conducting plates, as shown in Figs. 4, 5, 6 and 9, and water is used as a heat-changing medium, it enters into the bottom conduit, passes through the intermediate conduit or conduits, as the case may be, and leaves the apparatus through the top conduit.

The apparatus above described is especially adapted for indirect heating or cooling systems for buildings and as the air for heating or cooling is delivered to the various parts of the building from one point, it is essential that the temperature changing apparatus be so constructed that it will not materially retard the flow of the air delivered by the fan. Hence, the apparatus consists of a cellular structure which has the cells or air passages open at the sides of the structure of largest area, and the fan is of such size as to deliver a current or blast of air which is in cross-sectional area substantially the same as the cross-sectional area of the greatest dimension of the cellular structure. Therefore, every cell or air passage of the structure is utilized and as the walls of the cells are effectively heated or cooled, and are of relatively large dimension, the air cells or passages do not have to be of any considerable length to effect the proper heating or cooling of the air. It is also to be noted that the air inlet side of the structure is flat or plane so that the fan can be disposed in close proximity thereto, and as a consequence, a common casing or mantle houses the cellular structure and fan.

I claim:—

The combination of a radiator formed of a plurality of parallel flattened conduits arranged in spaced relation to each other, said conduits being in communication with each contiguous conduit at alternately opposite ends whereby the heating medium will flow through the conduits alternately in opposite directions, a sinuously formed metal sheet located between adjacent conduits, each bend being alternately in contact with said conduits, an open cylindrical casing surrounding said radiator, heat diffusing elements spaced apart extending from the outer radiator conduits to said casing, a fan in said casing, a motor in operative connection with said fan, a steam supply pipe leading to the motor, an exhaust pipe leading to and in communication with the top of said radiator.

In testimony whereof I have signed my name to this specification in the presence of two subscribing witnesses.

HUGO JUNKERS.

Witnesses:
HENRY QUADLICZ,
GERARD VELLERS.